3,526,521
PRODUCTION OF CURED WHOLE MEAT
Stephan L. Komarik, Coral Gables, Fla., assignor to The Griffith Laboratories, Inc., Chicago, Ill., a corporation of Illinois
No Drawing. Filed Dec. 1, 1966, Ser. No. 598,157
Int. Cl. A23b 1/03
U.S. Cl. 99—159    6 Claims

ABSTRACT OF THE DISCLOSURE

Fresh meat in whole or sliced pieces is treated with aqueously dissolved agents consisting essentially of sodium chloride, glucono delta lactone and curing salt selected from the group consisting of alkali metal nitrite and a mixture of alkali metal nitrite and nitrate, which solution is free of gluconic acid, and which may contain ene-diol compound such as sodium erythorbate. Curing is completed by heat or in a chill room, with the whole meat in the form of packaged slices isolated from the atmosphere, while the pH of the mass is lowered by hydrolysis of the lactone. Preferably the slices are cured in vacuum-packed packages.

---

The present invention relates to curing fresh whole meat with a combination of agents permitting cure to take place in a meat-chilling environment. In particular, it relates to subjecting whole meat to curing contact with said agents and then curing slices of the meat within packages, especially in said chilling environment.

It is known to form meat emulsions by chopping and emulsifying a mixture of fresh whole meat pieces, glucono delta lactone (GDL) and curing salt compositions of sodium chloride, sodium nitrite and sodium nitrate. The GDL begins to hydrolyze to gluconic acid in the emulsion to effect the cure in the added acid environment. Because such an acid condition during emulsification produces a poor emulsion, the GDL is added just before or during the process of emulsification, to avoid a subsequent operation of mixing it into an already-formed emulsion.

It has now been ascertained that fresh whole meat which naturally has a content of lactic acid and a variable pH below 7 according to the age and kind of the meat, may be more readily cured by having its pH gradually lowered, preferably in the presence of ene-diol compound, such as sodium ascorbate or sodium erythorbate, and in the presence of curing compositions of sodium chloride and curing salt selected from the group consisting of alkali-metal nitrite and a mixture of alkali-metal nitrite and alkali-metal nitrate. By providing aqueously dissolved agents consisting essentially of sodium chloride, GDL and said curing salt composition, with or without ene-diol compound, the pH of the meat is gradually lowered by the hydrolysis of the GDL. The cure takes place more efficiently and quicker, at a pH lower than the pH of the fresh meat. The gradual formation of acid parallels the gradual utilization of the nitrogen oxides from the curing salt, which leaves residual alkali-metal oxide. The latter is neutralized by some of the gluconic acid and the continuously forming excess of gluconic acid keeps the pH low to favor the cure.

By this procedure it has been found unexpectedly that the cure takes place in a meat-chilling environment, especially when the main body of the meat is isolated from the atmosphere, as when slices of it are cured in packaged form suitable for sale, and when large bodies such as hams and bellies are unsliced.

Accordingly, it is the object of the present invention to effect a nitrite cure of fresh whole meat with a pH-lowering initial content of GDL.

It is a particular object of the invention to cure such meat in the form of packaged slices.

It is also a particular object of the invention to cure such meat merely by storage in a meat-chilling environment.

In the following description of the invention the curing of hams, pork bellies and loins, is illustrated by particular reference to the production of packaged sliced bacon.

Long before the use of ene-diol compounds was discovered, meat was successfully cured with nitrite salt. Ene-diol compounds do not change the basic process, but do produce better color and such use is generally practiced. The present invention is another way to improve the color and may be used with or without ene-diol compounds.

The present invention is based on the discovery that when a pH-lowering quantity of GDL is used in amount upwardly from 1.5 ounces to 100 pounds of meat, a nitrite cure can take place either by heating in the conventional manner, or surprisingly, merely by storage in a chillroom, preferably in substantial confinement from contact with the atmosphere, as by the outer layers of a whole ham or pork belly, or by the overwrapping or vacuum packaging of slices. GDL used in amounts in the range from 1.5 to 8 ounces per 100 pounds of meat is adequate, the lower amounts being used for pork bellies which have a much lower content of lean to be cured than do whole meat bodies, such as hams.

In one aspect, the present invention is an improvement of the process set forth in my U.S. Pat. No. 2,902,369. Said patent describes the slicing of chilled untreated pork bellies and loins, in such a manner that they fall and shingle. So shingled, the slices are positioned for packaging. In the process curing pickle containing alkali-metal nitrite is sprayed onto at least one surface of the slices as they fall. The shingled slices are then subjected to heat, as by exposing them to heat from an infrared source. Red filters are used to eliminate actinic rays. Such heat is capable of rendering the fat at temperatures above 140° F., so cooling the exposed slices is practiced to achieve a curing temperature in the range from 115° to 140° F., and preferably from 115° to 125° F. in 10 to 15 minutes. Cooling air is blown over the exposed slices at 400 to 800 feet per minute.

According to one aspect of the present invention, the slices to be nitrite-cured may be sprayed with a dissolved curing salt composition, dissolved ene-diol compound, such as sodium erythorbate, and with a pH-lowering quantity of dissolved glucono delta lactone (GDL), and heat need not be used for cure. The invention is based upon the property of dissolved GDL slowly to hydrolyze to gluconic acid, the colder the solution, the slower the hydrolysis. The process is practiced so that the hydrolysis takes place in the meat in the presence of the nitrite salt and the ene-diol compound.

The slices so treated are promptly packaged by overwrapping or vacuum packaging and then cured in the package either by heat in the conventional way or by storage in the cold. Another surprising result is a greatly reduced content of microorganisms in the cured slices.

Although it is preferred to apply the dissolved agents to slices as they fall, the invention is not so limited. Slices may be dipped in a brine of the essential agents and drained under conditions to leave the desired amount of brine carried by the slice. A preferred and more accurate way to proportion the brine to the meat is to inject it in a conventional way, such as by multiple-needle injection, into pork bellies, loins or hams, or by arterial pumping in the case of hams. Where slices are to be cured in the package, the whole meat piece in which the distribution of the pickle has reached equilibrium is sliced for packaging.

When pork belly slices are sprayed, the brine is allowed to penetrate for 1 to 2 minutes, and then the slices are passed through a smoke chamber which adds smoke flavor and dries the wet surfaces. Otherwise, smoke flavor may be added to the pickle, and the surfaces may be dried by a stream of air.

The gradual hydrolysis of the GDL and the attendant lowering of the pH produces a continuing reaction of the gluconic acid on the nitrite salt liberating dissolved nitrous acid. The nitrous acid slowly combines with the pigment proteins of the meat eventually to form the cured red color. However, nitrous acid has antibacterial properties, and before combining with the meat is effective to lower the bacterial content of the packaged slices.

Both nitrite salt and ascorbate salt when together are not stable in acid solution and a solution containing them cannot be stored for long when it is initially non-acid and contains GDL. Accordingly, when a single solution is employed in the present invention it must be prepared and used before any appreciable formation of gluconic acid takes place. Two solutions may be employed, one of which contains the GDL without nitrite and ascorbate. The two solutions may be proportionally combined to form one solution for immediate spraying or injecting, or two separate but proportional sprays or injections may be practiced.

There is a difficulty in storing a solution containing gluconic acid resulting from hydrolysis of GDL, and nitrite salt, or ascorbate salt, or both, because the values of said salts decrease with age by reaction with the gluconic acid. The warmer the solution the faster is the loss. The following details exemplify the conditions for loss.

Addition of 4 ounces of GDL to 1 gallon of curing pickel at 40° F. results in no loss of nitrite in 30 minutes and a negligible loss of 5% ascorbate. After one hour the values are unchanged. After two hours the pH has dropped so that the ascorbate loss is 20% with little nitrite loss.

When 8 ounces of GDL are added to one gallon of curing pickle at 30° F. there is about a 10% loss in ascorbate and no loss of nitrite in 30 minutes. After one hour the loss of ascorbate is 20% and the nitrite loss is 10%. After two hours the ascorbate value drops to 40% and the nitrite value is about 85%.

When 8 ounces of GDL are added to one gallon of curing pickle at 40° F., these changes occur more rapidly, and in 30 minutes the ascorbate value is reduced to 10% with little change in nitrite. When 6 ounces of GDL per gallon are used the results are intermediate between those for 4 and 8 ounces.

These results show that in order to make a compatible combination of GDL, nitrite and/or ascorbate, it is essential that the concentration of GDL, and the temperature and the time of storage, be considered with respect to the time of using the pickle.

The present invention contemplates that when GDL is in solution and before any substantial hydrolysis, it is within the meat along with the nitrite and ascorbate so that the liberation of nitrous acid takes place in the meat where the nitrous acid can be effective on bacteria before being taken up by the meat in the curing process.

The conventional amounts of sodium chloride, nitrite salt and ascorbate salt, or other ene-diol compound for meat curing, may be used, but to achieve the cold cure, the GDL should be applied in amount upwardly from about 1½ ounces per 100 pounds of meat, 8 ounces being presently the top limit permitted by certain Government regulations directed primarily to use of it in encased emulsified meat products.

Examples 1 and 1a

The invention is illustrated by use of a procedure with and without GDL. The following control solution was made for use with pork bellies and loins:

| | Ounces |
|---|---|
| Water (.5 gallon) | 66.6 |
| Sodium nitrite | .24 |
| Sodium erythorbate | .65 |
| Sodium cyclamate | .123 |
| Sodium chloride | 20.8 |
| Total | 88.413 |

For the invention the above control solution was used to dissolve 2 ounces of GDL, creating a solution having 2.2% GDL.

Paired pork bellies were super-chilled, then sliced to about ⅛-inch thickness. The slices of one belly were sprayed as they fell with the control solution and those of the other belly were sprayed with the GDL-containing solution, in each case adding 5% by weight or 1.76 ounces of GDL per 100 pounds of meat. The sprayed slices were shingled on a bacon board with absorbent paper under the slices. The shingled slices were surface-dried by exposure in a heated chamber for about 20 minutes, attaining a slice temperature of 75° to 80° F. Then they were chilled, vacuum packaged, and stored at 45° F.

After 14 days in storage, the packaged slices had an excellent cured color. A bacterial count was made. The slices with GDL had about 6% of the bacterial content found in the control slices lacking GDL. The actual counts were:

| | Count per gram | pH |
|---|---|---|
| Example 1—Control | 12,200,000 | 5.8 |
| Example 1a—GDL | 780,000 | 5.5 |

Examples 2 and 2a

The procedure of Examples 1 and 1a was repeated increasing the amount of GDL in the pickle of Example 1a from 2 ounces to 6 ounces, thus using 5.3 ounces of GDL per 100 pounds of pork belly.

After 5 days in storage at 45° F. the counts of putrefactive anaerobes per gram were:

| | Count per gram | pH |
|---|---|---|
| Example 2—Control | 3,000 | 5.99 |
| Example 2a—GDL | 40 | 5.0 |

The storage was continued for an additional 9 days at room temperature of 72°–75° F., and the count of putrefactive anaerobes was made. The control had 100,000 per gram and the GDL specimens had less than 1 per gram. The control specimens had a putrid odor; and the GDL specimens had an acid odor comparable to that of a Thuringer sausage The invention is not limited to pork bellies which have a low lean content. Boneless pork lions for Canadian bacon have a high lean content and more GDL is used because of the greater content of lean, as shown in Examples 3 and 3a.

Examples 3 and 3a

The control pickle solution used was the same as the control of Examples 1 and 2, and the GDL per gallon was increased to 7.15 ounces. The loins were sliced to ¼-inch thickness and semi-frozen at 26° F. They were then dipped in the pickle and drained to increase the weight by 50%, thus using 6.25 ounces of GDL per 100 pounds of meat.

The slices were then vacuum packaged and stored at 45° F. After 5 days the pH and bacterial counts were:

|  | Count per gram | pH |
|---|---|---|
| Example 3—Control | 690,000 | 5.65 |
| Example 3a—GDL | 62,000 | 4.90 |

Then the packages were held at room temperature for 9 days at 72° to 75° F. The bacterial count was 25% less in the GDL samples than in the control.

In all cases, after 5 days cold storage, the packaged slices of the above GDL examples had an excellent red cured color.

Other examples of the invention have been carried out in which the packaging has been merely overwrapping as well as vacuum packaging, with comparison of cure carried out at the chill temperature of 45° F. In all cases the control specimens failed to develop good color, whereas the GDL specimens, both overwrapped and vacuum packaged, developed saleable color, much better, however, in the vacuum packages.

The following examples illustrate the injection of whole meat using conventional multiple-needle injection as applied to pork bellies:

Examples 4 and 4a

A pickle liquor No. 4 was prepared as follows:

|  | Pounds |
|---|---|
| Water (100 gallons) | 833 |
| Sodium chloride | 94 |
| Ham flavor | 6 |
| Curing salt composition | 61 |

Sodium erythorbate, 1.46%
Sodium nitrite, 3.00%
Sodium nitrate, 3.00%
Sodium bicarbonate, 2.81%
Sodium chloride, 88.72%
Sugar, 1.00%
  50% corn
  50% cane As a control one of two paired chilled pork bellies was injected to 10% increase in weight, thus using 10 pounds of said liquor per 100 pounds of meat. The injected belly was held in a cooler overnight. Then it was placed in a heating chamber until the internal temperature reached 128° F. The belly was then chilled, sliced and packaged. One-half was packaged by overwrapping. The other half was vacuum packaged to exclude air.

To a second pickle liquor like No. 4 above, but cooled to 30° F., was added 50 pounds of GDL to attain a 5% content of GDL. This was used within 30 minutes on the second one of the two paired bellies and the belly was processed as above, thus using approximately 8 ounces of GDL per 100 pounds of meat. The belly was processed, sliced and packaged at the same time as the first belly and in the same way.

After periods of three days and eleven days during storage and exposure each day to daylight for periodic intervals, the packages were examined and analyzed. For reporting the products are designated as follows.

Control—O: Control, overwrapped—Example 4.
Control—V: Control, vacuum packed—Example 4.
GDL—O: GDL, overwrapped—Example 4a.
GDL—V: GDL, vacuum packed—Example 4a.

TABLE I.—COLOR OBSERVATION

|  | Three days | Eleven days |
|---|---|---|
| Control—O | Not good, some gray | Dark. |
| GDL—O | Good pink | Pink. |
| Control—V | Some gray, better than Control—O. | Dark brown. |
| GDL—V | Best of all and very good | Strikingly better pink. |

The bacon treated without GDL shows that in three days the overwrapped control is inferior in initial color to that of overwrapped GDL slices. After eleven days the effect is more striking.

Examples 5 and 5a

Examples 5 and 5a correspond, respectively, to Examples 4 and 4a, with the following variations. After the cooling of the injected paired bellies overnight, they were sliced. The slices were shingled on a bacon board over absorbent paper to take up any drained fluid. In order to remove the surface liquid the shingled slices were placed in a heating chamber of low heat for about 20 minutes, achieving a slice temperature of 75° to 80° F. The slices were then chilled, and then packaged, one-half by overwrapping and one-half by vacuum packaging. The packages were held in a cooler. After three and eleven days the following observations of color were made:

TABLE II.—COLOR OBSERVATION

| Ex. | Three days | Eleven days |
|---|---|---|
| 5 | Control—O: Very little pink, much gray. | 75% of surface-brown, one edge dull pink. |
| 5a | GDL—O: Good pink | Very pink, some browning at one end. |
| 5 | Control—O: Dull, very little color. | No pink, light brown. |
| 5a | GDL—V: Very bright red-pink | Beautiful red color. |

The advantage of injecting GDL into the meat is shown more strikingly by Examples 5 and 5a. In this instance, the injected belly is not brought to the conventional temperature of 128° F. to develop the color, but after being exposed at room temperature with only sufficient heat to dry off the surfaces of the slices, the slices were placed in a chillroom and the cure developed.

The bacon slices cured without GDL show poor cure color in three days, and after eleven days are brown with almost no sign of typical cured red color. In contrast using the same process but with the addition of GDL, the cured color comes through more perfect at the elevated temperature and even during chillroom storage. Regardless of temperature for the cure, the bacon vacuum packed has better red color than the overwrapped in three days, which remains until at least eleven days. The bacon containing GDL overwrapped is not as good as that which is vacuum packed, but was saleable and superior to conventionally processed packaged bacon using no GDL.

In addition, it has been observed that the presence of acid from the GDL serves to minimize the residue of sodium nitrite in the finished bacon, which indicates that the improved cure at least in part derives from the more efficient use of the nitrite employed.

The analyses are shown in Table III, showing sodium nitrite in parts per million, and the pH of the meat.

TABLE III

| Example | Item | $NaNO_2$ (p.p.m.) | pH |
|---|---|---|---|
| 4 | Control—O | 69 | 5.90 |
| 4a | GLD—O | 30 | 5.70 |
| 5 | Control—O | 86 | 5.80 |
| 5a | GDL—O | 42 | 5.48 |

The excess liquid in the shingled slices can be removed by a blast of air, rather than by exposure on absorbent paper. Approved liquid smoke may be applied if smoke flavor is desired. This can be included in the pickle liquor by use of liquid smoke. Also, the slices can be exposed to real smoke in a smokehouse at any temperature up to 128° F.

Examples 6 and 6a.—Hams

A pickle liquor was prepared as follows:

| | Pounds |
|---|---|
| Water (100 gallons) | 833 |
| Sodium chloride | 131 |
| Ham flavor | 6 |
| Curing salt composition | 61 |

Sodium erythorbate, 1.75%
Sodium nitrite, 3.00%
Sodium nitrate, 3.00%
Sodium carbonate, 2.81%
Sodium chloride, 88.72%
Sugar, 1.00%
  50% corn
  50% cane One of two paired hams was artery pumped with the above pickle liquor to increase the weight of the ham by 10%. The other of the two paired hams was similarly pumped with the same solution to which was added 600 ozs. of GDL in the formula above. Both pumped hams were held five days in the cooler and then dry rubbed with the following composition:

| | Percent |
|---|---|
| Sodium chloride | 73 |
| Cane sugar | 25 |
| Sodium nitrite | 1.01 |
| Sodium nitrate | 0.65 |

The rubbed hams were placed in the smokehouse until an internal temperature of 152° F. was reached. Then the finished hams were sliced and slices both vacuum packaged and overwrapped. After five days the wrapped slices were inspected and those produced with GDL were pinker than those prepared without GDL.

Examples 7 and 7a.—Bacon, no ascorbate

A pickle liquor according to Example 6, but lacking in sodium erythorbate was used to pump a pork belly to increase the weight by 10% as a control.

A second belly was similarly pumped but the liquor contained in addition GDL in quantity to provide 2 ounces per 100 pounds of meat.

The two bellies were then heated in the smokehouse to an internal temperature of 128° F. On cooling the bellies were sliced and packaged by overwrapping and by vacuum packaging. After ten days the GDL bacon had the better red color.

Examples 8 and 8a.—No heat, no ascorbate

Examples 7 and 7a were repeated but the pumped bellies were not heated. After pumping a time of about one day was allowed for diffusion of the liquor throughout the belly. Then, the bellies were sliced and packaged by overwrapping and by vacuum. After ten days in the coolroom, the transparent packages, which had been exposed to light, were examined. Both the control and the GDL specimens had red color, but the GDL samples were the better.

As a practical matter meat packers desire fast curing processes not only for quick turnover of inventory, but to eliminate the need for large volume coolers which would be required for prolonged cold curing. Accordingly, the present invention contemplates that after the injection of the meat for cure, including the introduction of GDL, the whole meat piece may be heated to hasten the cure in the conventional manner. It is conventional to heat the pork meat to internal temperatures approximately as follows: bellies—128° F., loins—142° F. and hams—152° F.

In practicing such conventional heating for cure, it is normal that there is some delay after the injection before the heating is begun. It is immaterial to the final result whether or not all of the GDL has hydrolyzed before the heating and if not, the heating accelerates the hydrolysis.

The foregoing data of Examples 4a and 5a results from use of 8 ounces of GDL per 100 pounds of meat and Example 6a uses 5.6 ounces per 100 pounds of meat. However, the improvement in color can result from use of as little as 1½ ounces of GDL per 100 pounds of meat.

Other embodiments of the invention are contemplated as falling within the scope of the appended claims.

I claim:

1. The method of curing whole fresh meat which comprises initiating a gradual lowering of the pH of the meat by applying to the substance of the meat aqueously dissolved agents consisting essentially of sodium chloride, a pH-lowering quantity of glucono delta lactone and curing salt selected from the group consisting of alkali-metal nitrite and a mixture of alkali-metal nitrite and alkali-metal nitrate, the solution of said lactone being substantially free from gluconic acid, the amount of said lactone being from 1.5 to 8 ounces per 100 pounds of meat, and allowing the whole meat to complete its cure in the form of packaged slices isolated from the atmosphere.

2. The method of claim 1 in which the meat is allowed to cure in a meat-chilling environment.

3. The method of claim 1 in which aqueously dissolved ene-diol compound is present.

4. The method of claim 3 in which the meat is allowed to cure in a meat-chilling environment.

5. The method of producing packages containing slices of cured meat which comprises slicing fresh meat, initiating a gradual lowering of the pH of the slices by applying to the slices aqueously dissolved agents consisting essentially of sodium chloride, ene-diol compound, glucono delta lactone, and curing salt selected from the group consisting of alkali-metal nitrate, and a mixture of alkali-metal nitrite and alkali-metal nitrate, the solution of said lactone being substantially free from gluconic acid, the amount of said lactone being from 1.5 to 8 ounces per 100 pounds of meat, isolating the meat from the atmosphere by packaging surface-dry groups of slices of said meat, and allowing the slices to complete the cure within the package.

6. The method of claim 5 in which the slices are vacuum packaged.

References Cited

UNITED STATES PATENTS

| 2,627,473 | 2/1953 | Brissey | 99—159 X |
| 2,992,116 | 7/1961 | Sair | 99—159 |
| 3,122,442 | 2/1964 | Sair | 99—159 X |
| 3,391,006 | 7/1968 | Sair et al. | 99—159 |

HYMAN LORD, Primary Examiner

UNITED STATES PATENT OFFICE
CERTIFICATE OF CORRECTION

Patent No. 3,526,521             Dated September 1, 1970

Inventor(s) Stephan L. Komarik

It is certified that error appears in the above-identified patent and that said Letters Patent are hereby corrected as shown below:

Column 8, line 49, "nitrate" should read --nitrite---

SIGNED AND
SEALED
JAN 5 1971

(SEAL)
Attest:

Edward M. Fletcher, Jr.
Attesting Officer

WILLIAM E. SCHUYLER, JR.
Commissioner of Patents